United States Patent
Matsui et al.

(10) Patent No.: US 7,613,460 B2
(45) Date of Patent: Nov. 3, 2009

(54) RADIO DEVICE, CHANNEL ALLOCATION METHOD, AND CHANNEL, ALLOCATION PROGRAM

(75) Inventors: Seiji Matsui, Gifu (JP); Jun Kitakado, Hashima (JP)

(73) Assignee: Kyocera Corporation, Kyoto-Shi (JP)

( * ) Notice: Subject to any disclaimer, the term of this patent is extended or adjusted under 35 U.S.C. 154(b) by 174 days.

(21) Appl. No.: 10/528,340

(22) PCT Filed: Sep. 1, 2003

(86) PCT No.: PCT/JP03/11180

§ 371 (c)(1),
(2), (4) Date: Mar. 18, 2005

(87) PCT Pub. No.: WO2004/030397

PCT Pub. Date: Apr. 8, 2004

(65) Prior Publication Data

US 2006/0052122 A1    Mar. 9, 2006

(30) Foreign Application Priority Data

Sep. 24, 2002   (JP) .............................. 2002-277026

(51) Int. Cl.
  *H04W 72/00*   (2009.01)
(52) U.S. Cl. ...................... 455/450; 455/464; 455/509; 455/154.1; 370/431; 370/437; 370/458
(58) Field of Classification Search .................. 455/450, 455/464, 509, 154.1, 526; 370/431, 437, 370/458
See application file for complete search history.

(56) References Cited

U.S. PATENT DOCUMENTS

| | | | | |
|---|---|---|---|---|
| 5,367,533 | A | * | 11/1994 | Schilling ..................... 370/342 |
| 5,396,648 | A | * | 3/1995 | Patsiokas et al. ............. 455/509 |
| 5,448,761 | A | * | 9/1995 | Ushirokawa .................. 455/62 |
| 5,507,008 | A | * | 4/1996 | Kanai et al. .................. 455/512 |
| 5,666,655 | A | * | 9/1997 | Ishikawa et al. ............. 455/512 |
| 5,708,968 | A | * | 1/1998 | Suzuki ........................ 455/464 |
| 5,886,988 | A | * | 3/1999 | Yun et al. .................... 370/329 |
| 6,125,148 | A |   | 9/2000 | Frodigh et al. |
| 6,349,217 | B1 | * | 2/2002 | Honcharenko et al. ... 455/562.1 |
| 2002/0114379 | A1 |   | 8/2002 | Uesugi et al. |
| 2003/0022629 | A1 |   | 1/2003 | Miyoshi et al. |

FOREIGN PATENT DOCUMENTS

EP    1 227 603 A1    7/2002

(Continued)

*Primary Examiner*—Nay A Maung
*Assistant Examiner*—Richard Chan
(74) *Attorney, Agent, or Firm*—Foley & Lardner LLP

(57) ABSTRACT

When there is a connection request to a base station supporting adaptive modulation from a terminal supporting adaptive modulation, the base station measures a D wave level that indicates communication environment of the transmission path. When the measured D wave level is not lower than a threshold value of D wave level at which communication is possible by a modulation method (16QAM) having larger multi-value number, the base station permits allocation of a wireless channel to the terminal. Therefore, even when the modulation method is switched from one having smaller multi-value number ($\pi/4$ shift QPSK) to one having larger multi-value number (16QAM) during communication after channel allocation to the terminal, degradation of communication quality due to the communication environment of the transmission path can be prevented.

17 Claims, 10 Drawing Sheets

FOREIGN PATENT DOCUMENTS

| | | |
|---|---|---|
| JP | 05-110500 | 4/1993 |
| JP | 11-098570 | 4/1999 |
| JP | 2001-515301 | 9/2001 |
| JP | 2002-064424 | 2/2002 |
| JP | 2002-084329 | 3/2002 |

* cited by examiner

F I G. 4
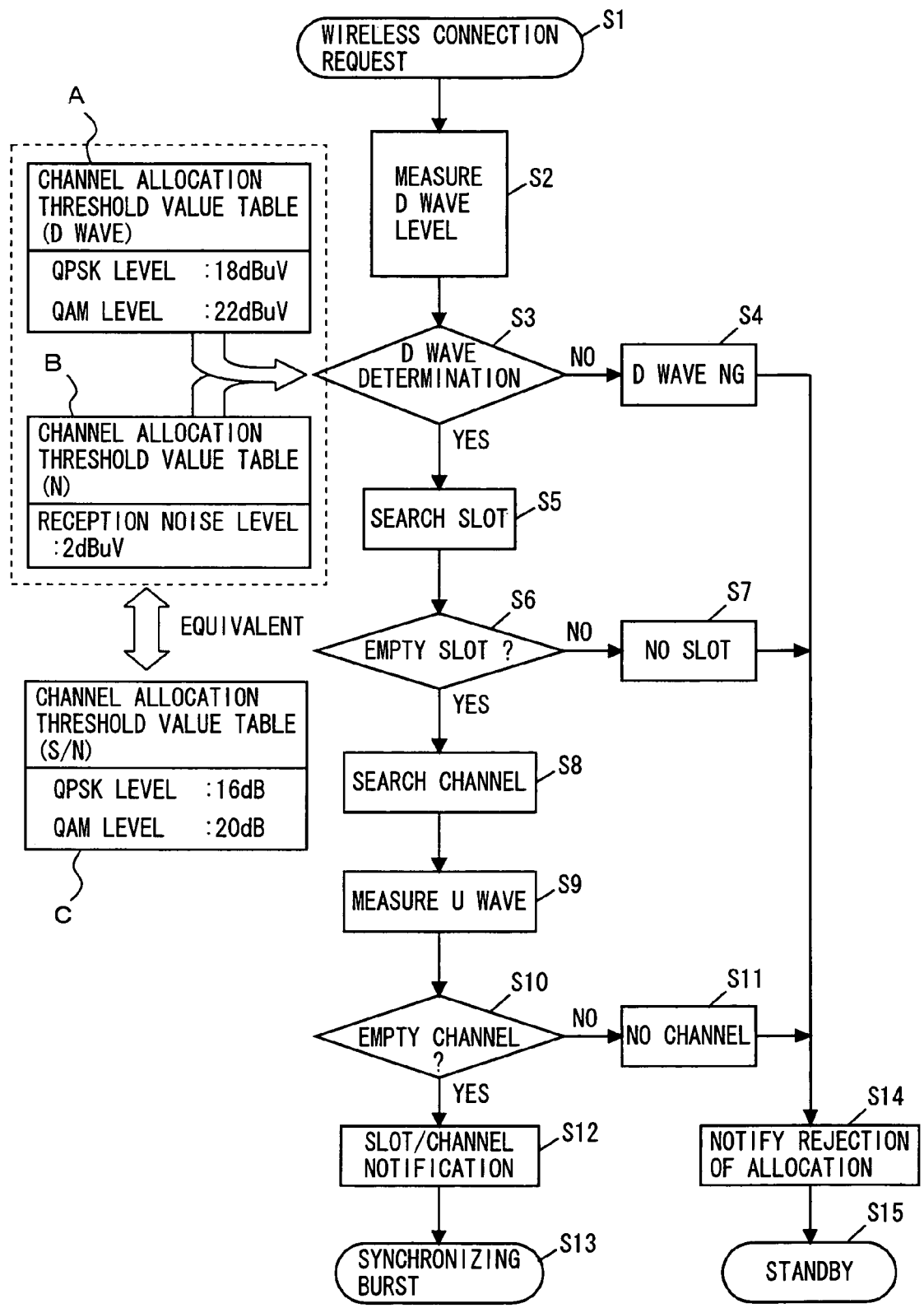

16QAM SYMBOL POINTS

π/4 SHIFT QPSK SYMBOL POINTS

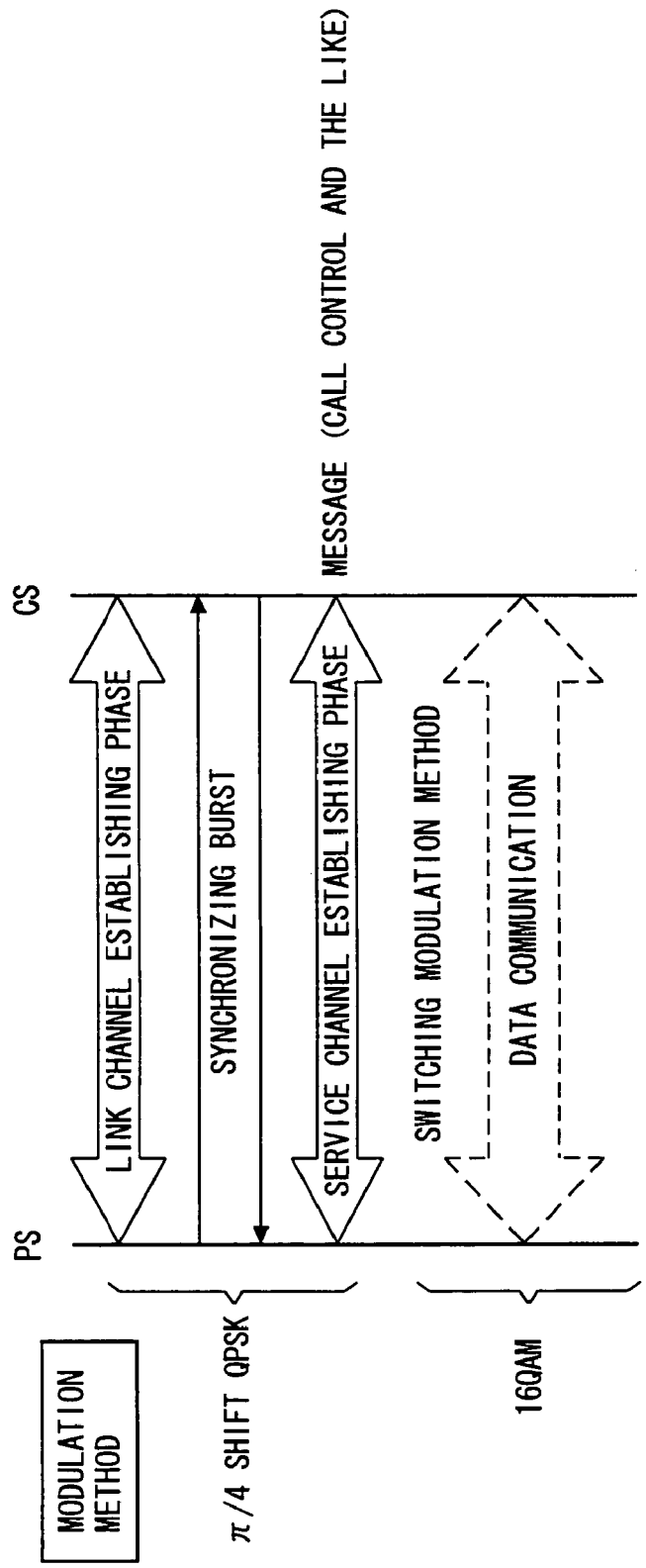

RADIO DEVICE, CHANNEL ALLOCATION METHOD, AND CHANNEL, ALLOCATION PROGRAM

This application is a National Stage application of PCT/JP03/11180, filed Sep. 1, 2003, which claims priority from Japanese patent application 2002-277026(P), filed Sep. 24, 2002. The entire contents of each of the aforementioned applications are incorporated herein by reference.

TECHNICAL FIELD

The present invention relates to a wireless apparatus, a channel allocation method and a channel allocation program. Particularly, the present invention relates to a wireless apparatus that can support a plurality of modulation methods of different multi-value numbers for modulation (hereinafter referred to as multi-value number), and to a method and a program of channel allocation when modulation method is switched during communication in such a wireless apparatus.

BACKGROUND ART

Conventionally, in a mobile communication system such as a PHS (Personal Handyphone System), communication is established between a mobile terminal apparatus (hereinafter referred to as a terminal or PS (Personal Station)) and a wireless base station (hereinafter referred to as a base station or a CS (Cell Station)), using a known π/4 shift QPSK (Quadrature Phase Shift Keying) modulation method.

FIG. 8A shows an arrangement of symbol points in accordance with the π/4 shift QPSK modulation method on an IQ coordinate plane. Referring to FIG. 8A, more specifically, in the π/4 shift QPSK modulation method, a symbol point of a received signal corresponds to any of four signal points positioned concentrically on the IP coordinate plane, as is well known, and therefore, 2-bits of data representing any of the four signal points can be transmitted at one time.

Conventionally, both in the stage of establishing wireless communication between the terminal and the base station through a control channel CCH (Control Channel) and in the stage of performing desired data communication of voice or the like through a traffic channel TCH (Traffic Channel), a fixed modulation method, such as the π/4 shift QPSK modulation method mentioned above, is used for communication.

In recent mobile communication system, data transmission of larger amount at higher speed than the conventional voice communication is required, such as in the case of data communication. Therefore, methods of modulation having larger multi-value number than the conventional π/4 shift QPSK modulation method have been developed.

As an example of such modulation method of larger multi-value number, 16QAM (Quadrature Amplitude Modulation) method has been known and practically used in some type of data communications.

FIG. 8B shows an arrangement of symbol points in accordance with the 16QAM modulation method on the IQ coordinate plane. Referring to FIG. 8B, according to the 16QAM method, a symbol point of a received signal corresponds to any of a total of 16 signal points on the entire plane, with the signal points being arranged in a lattice form of four points on each quadrant, on the IQ coordinate plane. Therefore, it is possible to transmit 4-bits of data representing any of the 16 signal points, at one time.

When a modulation method having larger multi-value number such as the 16QAM method is employed as the modulation method of the PHS, symbol points may possibly be recognized erroneously if communication environment of the transmission path is unsatisfactory (when the transmission path has considerable noise/interfering waves). Namely, this method has a characteristic that it has higher communication rate and is more prone to reception error, than the π/4 shift QPSK modulation method shown in FIG. 8A.

Generally, in the stage of establishing wireless connection through CCH, routine information only is transmitted between the terminal and the base station, and in this stage, higher rate of communication is not required. Therefore, communication rate attained by the conventional π/4 shift QPSK modulation method is sufficient.

In data communication through TCH, however, higher rate of data communication has been strongly desired, in order to transmit large amount of data.

In view of the foregoing, an idea of adaptive modulation has been proposed, in which communication is done in the conventional π/4 shift QPSK modulation method in the stage of establishing wireless connection through CCH, and in the stage of data communication through TCH after the connection is established, the modulation method is switched to the 16QAM method.

In the stage of establishing connection between the terminal and the base station, by way of example, the terminal transmits a wireless connection request to the base station. The base station measures, as a parameter representing a state of communication environment of the transmission path, a known RSSI (Received Signal Strength Indication) value as a D (Desired) wave level, based on a received signal power level of the desired signal, determines whether the measured D wave level exceeds a threshold value to realize communication with stable communication quality under the π/4 shift QPSK modulation method, and determines whether a wireless channel should be allocated or not, dependent on the result of determination.

The D wave level (RSSI value) corresponds to S of the signal-to-noise ratio (S/N ratio), and therefore, when the noise N received by the base station is known beforehand, the D wave level may be considered equivalent to the S/N ratio.

More specifically, the threshold value is set to such a D wave level that satisfies a error rate BER (Bit Error Rate) that can realize stable communication quality when communication is done in accordance with the π/4 shift QPSK modulation method. When the actually measured D wave level does not reach the threshold value, communication quality degrades, possibly resulting in reception error or disruption of wireless connection, and hence normal and stable communication is impossible.

Therefore, only when the actually measured D wave level exceeds the threshold value, a wireless channel is allocated (that is, connection is permitted) to the terminal requesting connection, and when the level does not reach the threshold value, wireless channel is not allocated (connection is rejected).

FIG. 9 is an illustration showing, with time, a communication procedure between a terminal (PS) and a base station (CS), when the modulation method is switched as described above (adaptive modulation).

First, in the stage of establishing wireless connection, communication takes place in accordance with the π/4 shift QPSK modulation method. A connection request may be made either by the terminal or the base station. In this example, it is assumed that the terminal transmitted the request.

First, through a link channel establishing phase, signals related to the wireless connection request are exchanged between the terminal and the base station. Specifically, the D wave level from the terminal is measured on the side of the base station, whether the measured D wave level exceeds the threshold value for allocating wireless channel of the π/4 shift QPSK modulation method described above or not is determined, and if the level exceeds the threshold value, subsequent process for establishing wireless connection is executed.

Specifically, exchange for a service channel establishing phase takes place, and when the terminal and the base station are synchronized thereby, message control (call control and the like) is executed between the terminal and the base station. Operations thus far correspond to the stage of establishing wireless connection executed by communication in accordance with the π/4 shift QPSK modulation method.

Thereafter, to enter the stage of data communication, assume that the modulation method is switched from the π/4 shift QPSK modulation method to the 16QAM method, in order to attain higher communication rate.

In this case, there is a possibility that communication quality degrades, causing data communication failure, as represented by dotted lines in FIG. 9, because of the following reasons.

Different modulation methods have different, unique error rate characteristics, as will be described later, and by way of example, the π/4 shift QPSK modulation method and the 16QAM method have much different characteristics. Therefore, even if the D wave level of a signal from the terminal at the base station satisfies the channel allocation threshold value of the π/4 shift QPSK modulation method, stable communication quality is not always ensured under the 16QAM modulation method.

Specifically, even when normal and stable communication is possible by the π/4 shift QPSK modulation method, wireless communication quality degrades when the method is switched to the 16QAM modulation method, and normal communication possibly fails because of communication error or an accident such as disruption of the wireless connection.

This point will be described in detail with reference to FIG. 10. FIG. 10 is a graph representing relation between the communication environment of the transmission path and the error rate in the received signal, for the π/4 shift QPSK modulation method and the 16QAM modulation method. It is noted that FIG. 10 is an exemplary graph allowing visual recognition of error rate with respect to the modulation method, and specific values are not necessarily precise.

Specifically, the abscissa of FIG. 10 represents signal-to-noise ratio (S/N ratio: considered as equivalent to D wave level) on the transmission path, and the ordinate represents error rate BER of the received signal.

Similar characteristics can be seen when the abscissa is replaced by a ratio of the D wave level on the transmission path to undesired signal level, that is, U (Undesired) wave level (D/U ratio).

Generally, in the digital communication system, a signal waveform received on the receiving side is returned to the digital information that was intended by the transmission side, by a demodulating process. The digital information is binary information of "0" or "1", and therefore, it is basically noise-free.

However, as described with reference to FIGS. 8A and 8B, when a large noise occurs in the middle of the transmission path, digital information of "0" or "1" to be transmitted may be transmitted erroneously because of the noise.

Transmission error is caused by noise or interfering wave as mentioned above, and from the S/N ratio (or D/U ratio) of the noise introduced to the transmission path and the modulated wave (desired transmission signal wave), an error rate (BER), which indicates how frequently error occurs when a large amount of information is transmitted, can roughly be assessed.

Specifically, the error rate is closely related to the S/N ratio (D/U ratio) on the transmission path, and hence it can be derived by calculation using well-known statistical theory: It is also known that different modulation method results in different error rate, even if the S/N ratio (D/U ratio) on the transmission path is the same.

Returning to the characteristic diagram of FIG. 10, the relation between the S/N ratio and the error rate BER of the π/4 shift QPSK modulation method is plotted in dotted line, while the relation between the S/N ratio and the error rate BER of the 16QAM method is plotted in chain-dotted line.

Referring to the example of FIG. 10, assume that the error rate BER of, for example, $10^{-4}$ is to be ensured regardless of the modulation method in order to maintain stable communication quality. From the graph of FIG. 10, it can be seen that by the π/4 shift QPSK modulation method (dotted line), the error rate can be suppressed to $10^{-4}$ or lower with the S/N ratio of about 6 dB or higher, whereas by the 16QAM method, the S/N ratio must be at least about 11 dB in order to suppress the error rate to $10^{-4}$ or lower.

Such difference in error rate characteristics among various modulation methods may lead to such a situation that, the S/N ratio of the transmission path exceeds the threshold value of S/N ratio for stable communication under the π/4 shift QPSK modulation method (about 6 dB in the example of FIGS. 8A and 8B above) in the stage of establishing wireless connection and a wireless channel is allocated in the link channel establishing phase, while the S/N ratio at this time is below the S/N ratio for stable communication under the 16QAM modulation method (in the example of FIG. 10, about 11 dB or higher): if the modulation method is switched in this state from the π/4 shift QPSK modulation method to the 16QAM method, the error rate BER degrades (in the example of FIG. 10 above, the error rate becomes higher than $10^{-4}$) and wireless communication quality degrades, possibly causing communication error or disruption of wireless connection.

The same applies when D/U ratio is referred to in place of the S/N ratio of the transmission path.

As described above, a conventional wireless apparatus that supports adaptive modulation has a problem that even when wireless connection is once established under a modulation method of smaller multi-value number and a channel is allocated, normal communication may fail due to degraded communication quality when the modulation method is switched to one having larger multi-value number during communication.

DISCLOSURE OF THE INVENTION

Therefore, an object of the present invention is to provide a wireless apparatus capable of supporting a plurality of modulation methods having different multi-value numbers and free of communication quality degradation even when modulation method is switched during communication, as well as to a channel allocation method and program for such a wireless apparatus.

According to an aspect, the present invention provides a wireless apparatus that can support two types of modulation methods having different multi-value numbers, including modulation method switching means, storing means, parameter measuring means, parameter comparing means, and channel allocation determining means. The modulation method switching means switches, when another wireless apparatus to be in wireless connection with the wireless apparatus is capable of supporting two types of modulation methods, the modulation method between a first modulation method having a smaller multi-value number and a second modulation method having a larger multi-value number, while the wireless apparatus is communicating with said another wireless apparatus. The storing means stores a first threshold value of a parameter indicative of communication environment of transmission path, at which the wireless apparatus can communicate with another wireless apparatus at least by the second modulation method of the two types of modulation methods. The parameter measuring means measures the parameter based on a signal received from another wireless apparatus. The parameter comparing means compares, when there is a connection request from another wireless apparatus to the wireless apparatus, the stored first threshold value of the parameter corresponding to the second modulation method with the measured parameter. The channel allocation determining means permits allocation of a wireless channel to said another wireless apparatus, when it is determined by the parameter comparing means that the measured parameter is not lower than the stored first threshold value of the parameter.

Preferably, the storing means stores in advance a second threshold value of a parameter indicative of communication environment of transmission path, at which the wireless apparatus can communicate with another wireless apparatus by the first modulation method. When there is a connection request from another wireless apparatus that supports the first modulation method but not the second modulation method to the wireless apparatus, the parameter comparing means compares the stored second threshold value of the parameter corresponding to the first modulation method with the parameter measured by the parameter measuring means. The channel allocation determining means permits allocation of a wireless channel to said another wireless apparatus that supports the first modulation method but not the second modulation method, when it is determined by the parameter comparing means that the measured parameter is not lower than the stored second threshold value of the parameter.

Preferably, the channel allocation determining means determines presence/absence of any empty slot and empty channel in the wireless apparatus, and when there is no empty slot or empty channel, rejects allocation of a wireless channel regardless of the result of comparison by the parameter comparing means.

Preferably, the wireless apparatus further includes means for notifying another wireless apparatus requesting connection to the wireless apparatus about rejection of channel allocation, when the channel allocation determining means rejects allocation of the wireless channel.

Preferably, the parameter is based on a reception signal level from another wireless apparatus requesting connection to the wireless apparatus.

According to another aspect, the present invention provides a channel allocation method in a wireless apparatus that can support two types of modulation methods of different multi-value numbers, and the wireless apparatus includes: modulation method switching means for switching, when another wireless apparatus to be in wireless connection with the wireless apparatus is capable of supporting two types of modulation methods, the modulation method between a first modulation method having a smaller multi-value number and a second modulation method having a larger multi-value number, while the wireless apparatus is communicating with said another wireless apparatus; storing means for storing a first threshold value of a parameter indicative of communication environment of transmission path, at which the wireless apparatus can communicate with another wireless apparatus at least by the second modulation method of the two types of modulation methods; and parameter measuring means for measuring said parameter based on a signal received from another wireless apparatus. The channel allocation method includes the steps of comparing, when there is a connection request from another wireless apparatus to the wireless apparatus, the stored first threshold value of the parameter corresponding to the second modulation method with the measured parameter, and permitting, when it is determined that the measured parameter is not lower than the stored first threshold of the parameter, allocation of a wireless channel to said another wireless apparatus.

Preferably, the storing means stores in advance a second threshold value of a parameter indicative of communication environment of transmission path, at which the wireless apparatus can communicate with another wireless apparatus by the first modulation method. The channel allocation method includes the steps of comparing, when there is a connection request from another wireless apparatus that supports the first modulation method but not the second modulation method to the wireless apparatus, the stored second threshold value of the parameter corresponding to the first modulation method with the parameter measured by the parameter measuring means; and permitting, when it is determined that the measured parameter is not lower than the stored second threshold value of the parameter, allocation of a wireless channel to said another wireless apparatus that supports the first modulation method but not the second modulation method.

Preferably, the channel allocation method further includes the step of determining presence/absence of any empty slot and empty channel in the wireless apparatus, and when there is no empty slot or empty channel, rejecting allocation of a wireless channel regardless of the result of comparison in the parameter comparing step.

Preferably, the channel allocation method further includes the step of notifying another wireless apparatus requesting connection to the wireless apparatus about rejection of channel allocation, when allocation of a wireless channel is rejected.

Preferably, the parameter is based on a reception signal level from another wireless apparatus requesting connection to the wireless apparatus.

According to a still further aspect, the present invention provides a channel allocation program in a wireless apparatus that can support two types of modulation methods of different multi-value numbers, and the wireless apparatus includes: modulation method switching means for switching, when another wireless apparatus to be in wireless connection with the wireless apparatus is capable of supporting two types of modulation methods, the modulation method between a first modulation method having a smaller multi-value number and a second modulation method having a larger multi-value number, while the wireless apparatus is communicating with said another wireless apparatus; storing means for storing a first threshold value of a parameter indicative of communication environment of transmission path, at which the wireless apparatus can communicate with another wireless apparatus at least by the second modulation method of the two types of modulation methods; and parameter measuring means for measuring said parameter based on a signal received from another wireless apparatus. The channel allocation program causes a computer to execute the steps of comparing, when there is a connection request from another wireless apparatus to the wireless apparatus, the stored first threshold value of the parameter corresponding to the second modulation method with the measured parameter, and permitting, when it is determined that the measured parameter is not lower than the stored first threshold of the parameter, allocation of a wireless channel to said another wireless apparatus.

Preferably, the storing means stores in advance a second threshold value of a parameter indicative of communication environment of transmission path, at which the wireless apparatus can communicate with another wireless apparatus by the first modulation method. The channel allocation program causes the computer to further execute the steps of: comparing, when there is a connection request from another wireless apparatus that supports the first modulation method but not the second modulation method to the wireless apparatus, the stored second threshold value of the parameter corresponding to the first modulation method with the parameter measured by the parameter measuring means; and permitting, when it is determined that the measured parameter is not lower than the stored second threshold value of the parameter, allocation of a wireless channel to said another wireless apparatus that supports the first modulation method but not the second modulation method.

Preferably, the channel allocation program causes the computer to further execute the step of determining presence/absence of any empty slot and empty channel in the wireless apparatus, and when there is no empty slot or empty channel, rejecting allocation of a wireless channel regardless of the result of comparison in the parameter comparing step.

Preferably, the channel allocation program causes the computer to further execute the step of notifying another wireless apparatus requesting connection to the wireless apparatus about rejection of channel allocation, when allocation of a wireless channel is rejected.

Preferably, the parameter is based on a reception signal level from another wireless apparatus requesting connection to the wireless apparatus.

Therefore, according to the present invention, in a wireless apparatus supporting adaptive modulation, when there is a connection request from another wireless apparatus similarly supporting adaptive modulation, a parameter indicative of the communication environment of a transmission path is measured, and allocation of a wireless channel to the said another wireless apparatus is permitted when the measured parameter is not lower than a threshold value of the parameter at which communication is possible by a modulation method having larger multi-value number. Therefore, even when modulation method is switched from one having smaller multi-value number to one having larger multi-value number during communication after connection, degradation of communication quality can be avoided.

BRIEF DESCRIPTION OF THE DRAWINGS

FIG. 4 is a flow chart representing a method of channel allocation in accordance with a first embodiment of the present invention.

FIG. 9 is an illustration showing, with time, a communication procedure between a terminal and a base station in accordance with conventional adaptive modulation.

BEST MODE FOR CARRYING OUT THE INVENTION

Figure 1:
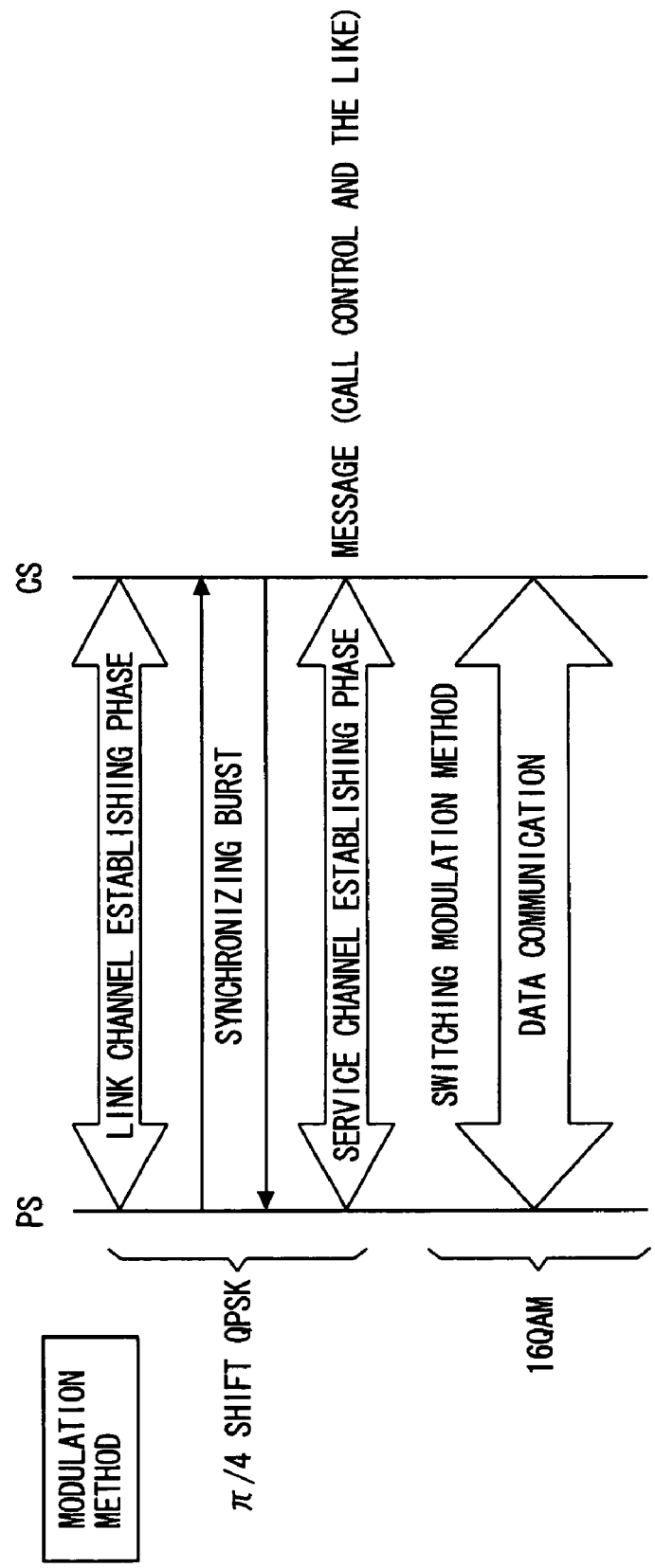
FIG. 1 is an illustration showing, with time, a communication procedure between a terminal and a base station in accordance with the present invention.

In the following, embodiments of the present invention will be described in detail with reference to the figures. In the figures, the same or corresponding portions are denoted by the same reference characters and description thereof will not be repeated.

First, the principle of the present invention will be described. The present invention is applicable to any wireless apparatus that supports adaptive modulation, that is, a wireless apparatus capable of communicating by a plurality of modulation methods having different multi-value numbers, including a base station or terminal constituting a mobile communication system such as the PHS. In the embodiments of the present invention below, examples of the present invention applied to a PHS base station as a mobile communication system will be described.

Further, in the embodiments of the present invention below, examples will be described in which the $\pi/4$ shift QPSK is employed as a modulation method having smaller multi-value number and the 16QAM is employed as a modulation method having larger multi-value number as modulation methods of adaptive modulation. The present invention, however, is not limited to these modulation methods, and it is applicable to any wireless apparatus that can support a plurality of modulation methods having different multi-value numbers.

According to the embodiments of the present invention, when there is a connection request to a wireless apparatus supporting adaptive modulation (hereinafter, a base station) from another wireless apparatus supporting adaptive modulation (hereinafter, a terminal), no matter what modulation method is used for communication at first, a threshold value of an RSSI value, that is, D wave level (that can be considered equivalent to the S/N ratio) as a parameter of communication environment of the transmission path at which communication is possible under the modulation method having larger multi-value number and used commonly by the apparatuses is compared with the D wave level measured at that time point, and when the measured D wave level is determined to be not lower than the threshold value, the base station permits allocation of a wireless channel (that is, permits connection).

In short, at the initial point when the terminal connects to the base station, whether the communication environment of the transmission path is in a state allowing communication without degrading communication quality when modulation method is switched to one having larger multi-value number (for example, 16QAM method) or not is determined, and if it is determined that the environment is not in a communicable state, connection itself is rejected no matter whether communication is actually done under the modulation method of larger multi-value number or not, so as to prevent possible degradation of communication quality expected to occur at the time of switching the modulation method after the connection is established.

FIG. 1 is an illustration showing, with time, a communication procedure between a terminal and a base station in accordance with the present invention.

First, in the stage of establishing wireless connection, communication takes place by the π/4 shift QPSK modulation method. A connection request may be made either from the base station or the terminal and, in this example, it is assumed that the terminal transmitted the request.

First, through the channel link establishing phase, signals related to the wireless connection request are exchanged between the terminal and the base station. Specifically, the D wave level from the terminal is measured on the side of the base station, whether the measured D wave level exceeds the threshold value for allocating wireless channel of the 16QAM modulation method having larger multi-value number as described above or not is determined, and if the level exceeds the threshold value, subsequent process for establishing wireless connection is executed.

Specifically, exchange for a service channel establishing phase takes place, and when the terminal and the base station are synchronized thereby, message control (call control and the like) is executed between the terminal and the base station. Operations thus far correspond to the stage of establishing wireless connection executed by communication in accordance with the π/4 shift QPSK modulation method.

Thereafter, to enter the stage of data communication, assume that the modulation method is switched from the π/4 shift QPSK modulation method to the 16QAM method, in order to attain higher communication rate.

In the conventional channel allocation method shown in FIG. 9, there is a possibility that communication quality degrades when the modulation method is switched to the 16QAM method, causing data communication failure, as represented by dotted lines in FIG. 9.

In contrast, in the embodiment shown in FIG. 1, a channel is allocated (connection is permitted) after it has been previously determined at the time of connection that the communication environment of the transmission path allows communication by 16QAM, and therefore, data communication with good communication quality is possible as represented by the solid line in FIG. 1 even when the modulation method is switched from the π/4 shift QPSK method having smaller multi-value number to the 16QAM method having larger multi-value number during communication.

Figure 2:
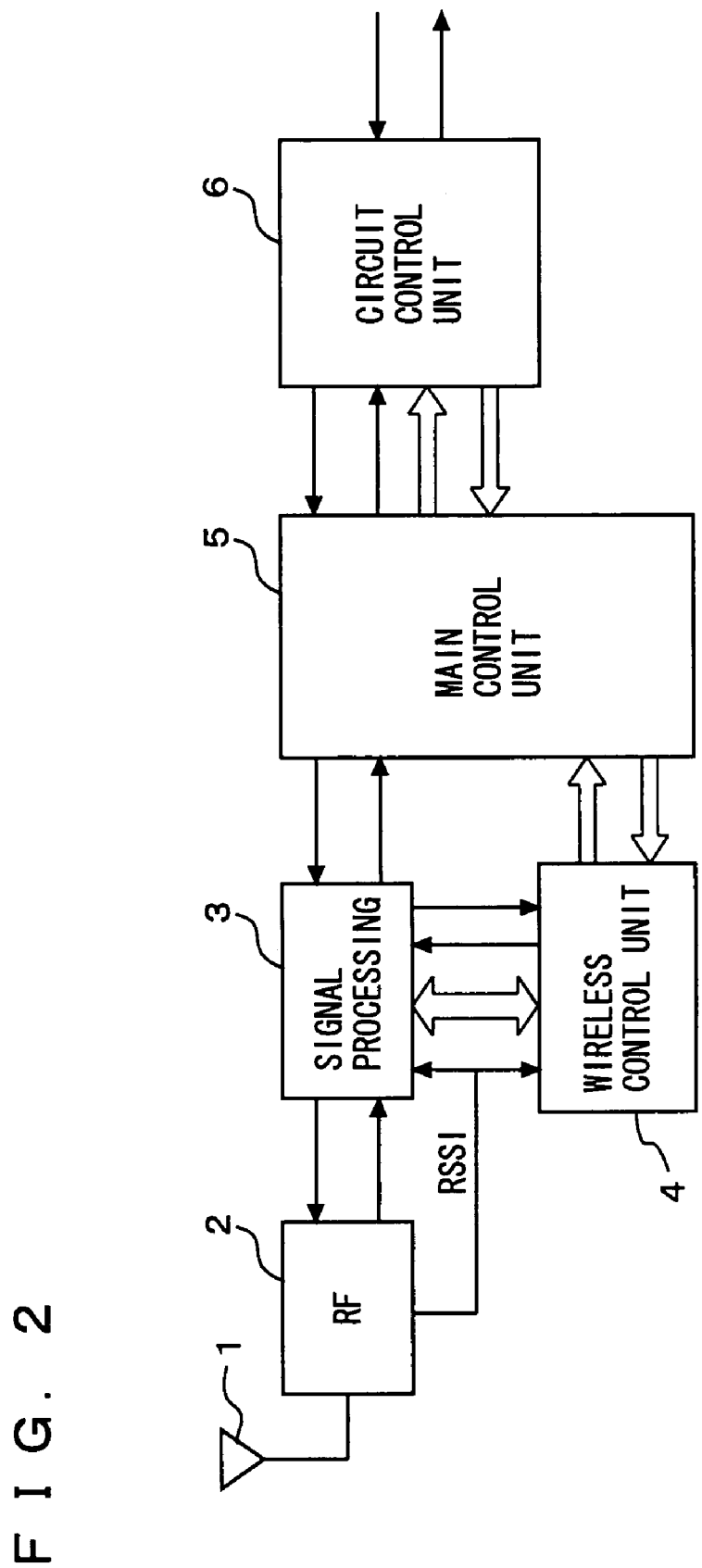
FIG. 2 is a functional block diagram representing a configuration of a base station as a wireless apparatus in accordance with an embodiment of the present invention.

FIG. 2 is a functional block diagram representing a configuration of a base station as a wireless apparatus in accordance with an embodiment of the present invention.

Referring to FIG. 2, a signal of radio frequency from another wireless apparatus (terminal) received from an antenna 1 is subjected to reception process at an RF processing unit 2, and applied to a signal processing unit 3. In signal processing unit 3, a process of switching among a plurality of modulation methods having different multi-value numbers is executed, under the control by a wireless control unit 4.

The signal that has been subjected to the reception process at RF processing unit 2 is demodulated by the selected modulation method (π/4 shift QPSK or 16QAM) at signal processing unit 3.

The demodulated received signal is applied to a main control unit 5, and decoded to a data signal. The decoded data signal is applied to a public circuit, not shown, through a circuit control unit 6.

On the other hand, a data signal to be transmitted is applied to main control unit 5 through circuit control unit 6 from the public circuit, not shown. The data signal encoded by main control unit 5 is modulated by the selected modulation method (π/4 shift QPSK or 16QAM) at signal processing unit 3.

The modulated transmission signal is subjected to a transmission process at RF processing unit 2, and transmitted through antenna 1.

Here, operations of wireless control unit 4 and circuit control unit 6 are controlled by main control unit 5.

Further, at RF processing unit 2, based on the received power level of the received signal, the RSSI value, that is, the D wave level is measured and applied to signal processing unit 3 and wireless control unit 4.

Figure 3:
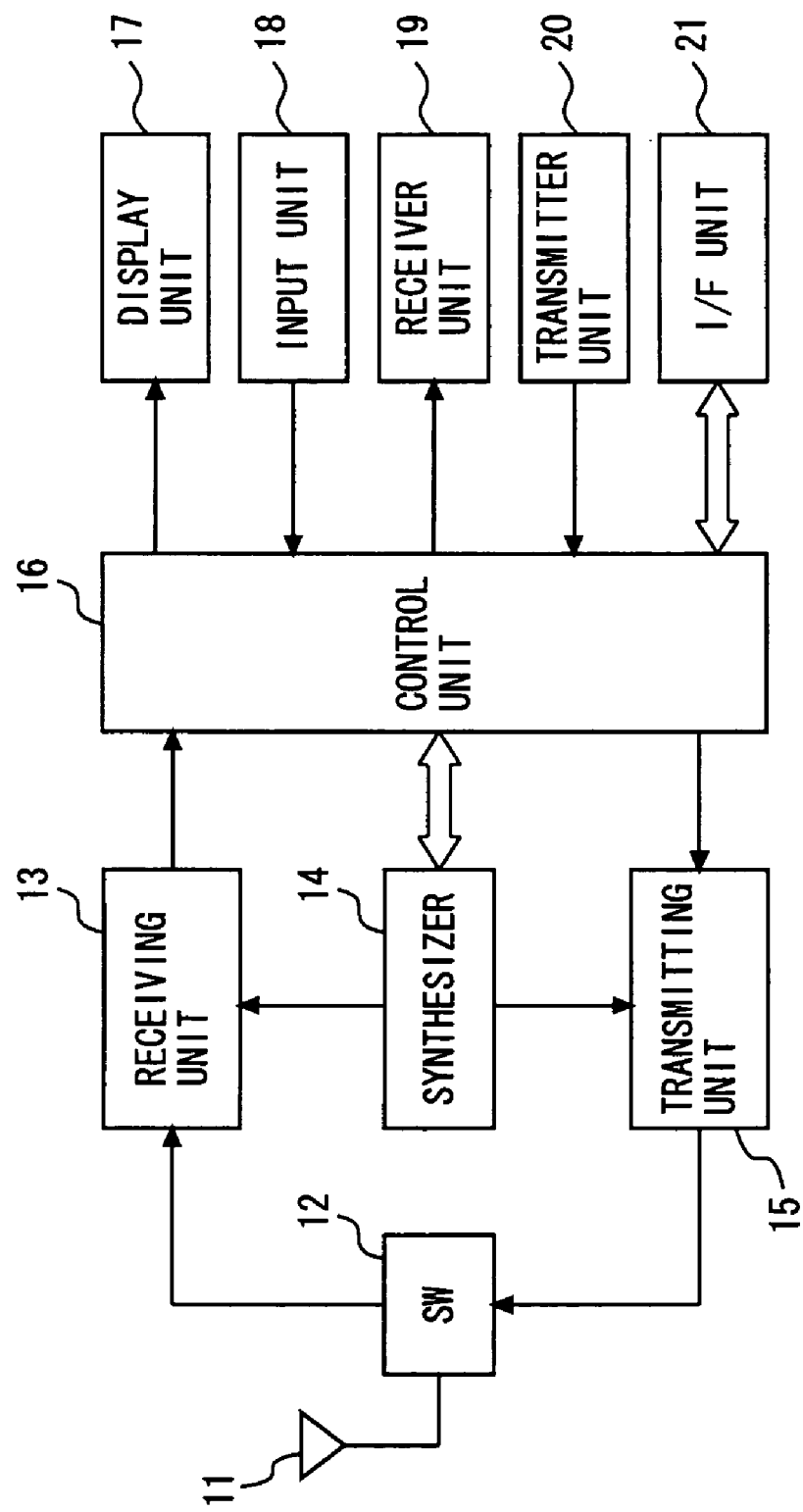
FIG. 3 is a functional block diagram representing a configuration of a terminal as a wireless apparatus in accordance with an embodiment of the present invention.

FIG. 3 is a functional block diagram representing a configuration of a terminal as a wireless apparatus in accordance with an embodiment of the present invention.

A signal received by antenna 11 from the base station is applied through a switch 12 to a receiving unit 13, where reception processing takes place. Specifically, the received signal that has been down-converted by the oscillation frequency supplied from a synthesizer is applied to a control unit 16.

Control unit 16 demodulates the received signal in accordance with the selected modulation method (π/4 shift QPSK or 16QAM). The demodulated received signal is converted to a voice signal and transmitted to the user, or displayed to the user as image information at a display unit 17.

Meanwhile, a transmission signal is input through an input unit 18 or a transmitter unit 20 to control unit 16, and control unit 16 modulates the transmission signal in accordance with the selected modulation method (π/4 shift QPSK or 16QAM) and applies to a transmitting unit 15.

Transmitting unit 15 performs a transmission process on the transmission signal. Specifically, the transmission signal up-converted by the oscillation frequency supplied from synthesizer 14 is applied through switch 12 to antenna 11, and transmitted from antenna 11.

The operation of synthesizer 14 is controlled by control unit 16.

The overall operation of the terminal shown in FIG. 3 is controlled by user instructions through an I/F unit 21.

Figure 5:
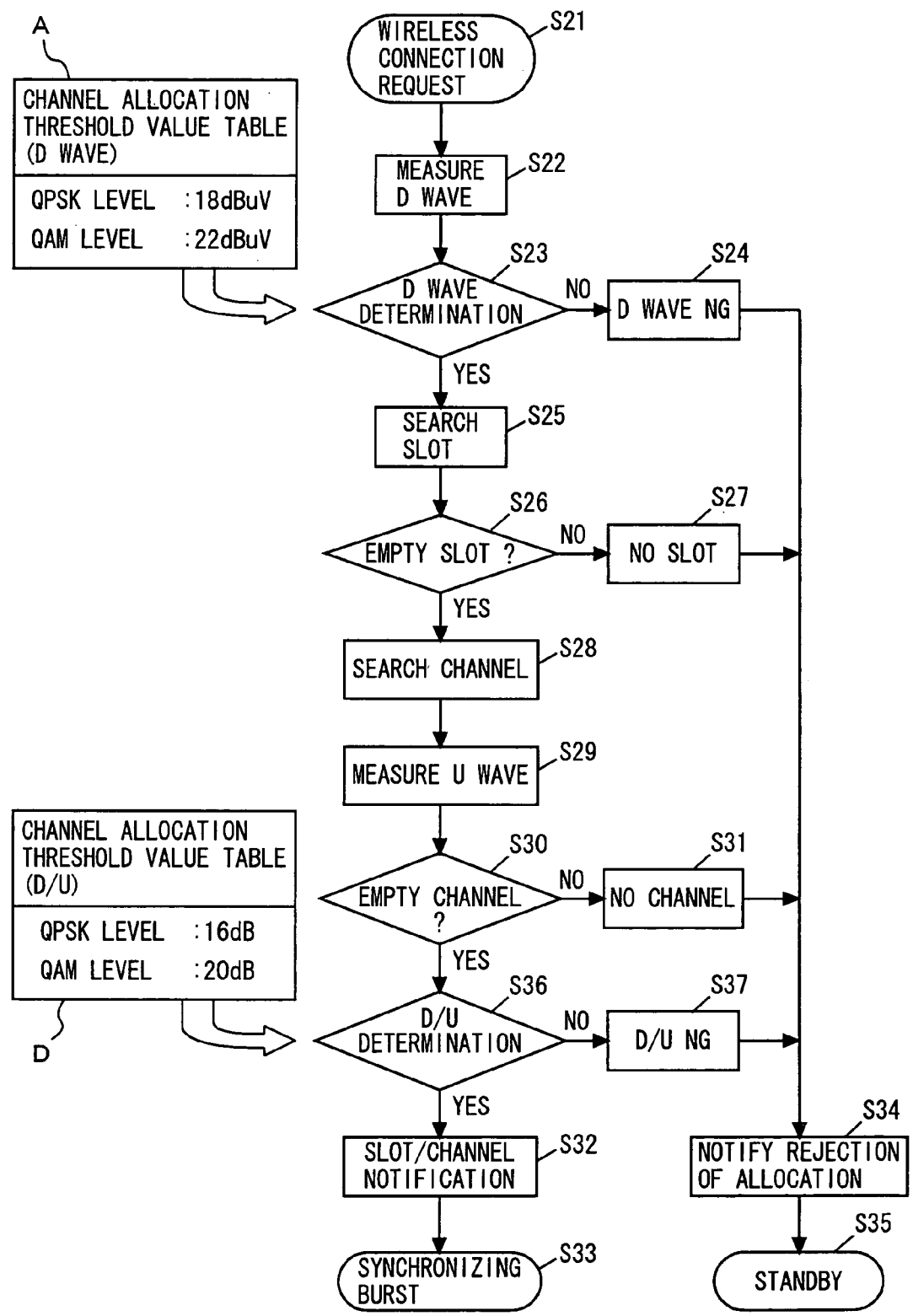
FIG. 5 is a flow chart representing a method of channel allocation in accordance with a second embodiment of the present invention.
Figure 6:
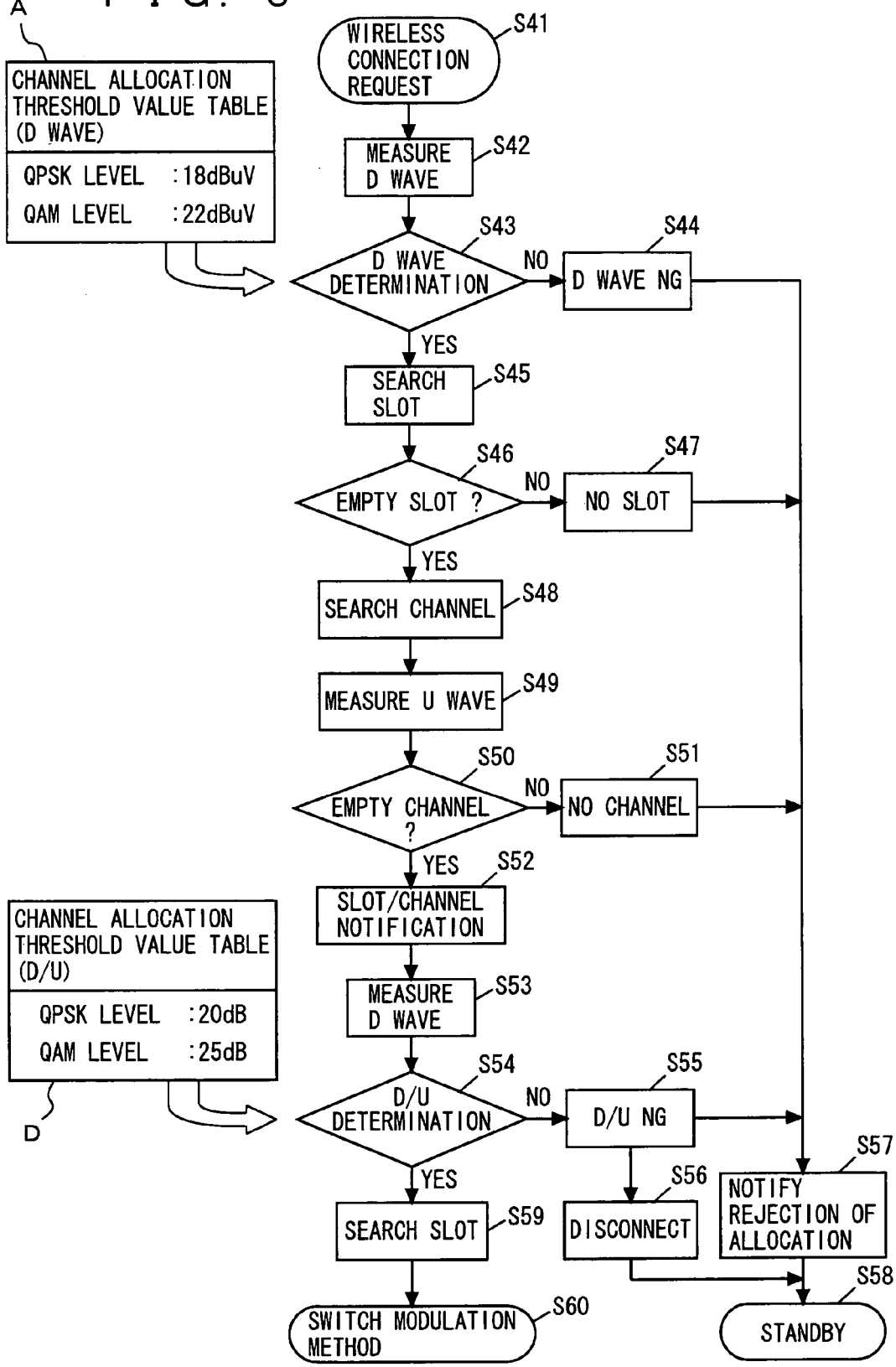
FIG. 6 is a flow chart representing a method of channel allocation in accordance with a third embodiment of the present invention.

Next, FIGS. 4 to 6 are flow charts representing the methods of channel allocation in accordance with the first to third embodiments of the present invention. According to the first to third embodiments, the methods of channel allocation described in the following are assumed to be executed by the base station shown in FIG. 2, in response to a connection request from the terminal shown in FIG. 3.

The configuration of the functional block diagram of the base station shown in FIG. 2 is actually executed by software in accordance with the flow charts of FIGS. 4 to 6, by a digital signal processor (DSP), not shown. The DSP reads a program including various steps shown in FIGS. 4 to 6 from a memory, not shown, and executes the same. The program may be downloaded from a center, not shown, through circuit control unit 6 of FIG. 2 and a public circuit.

First, in the first embodiment shown in FIG. 4, determination as to channel allocation is performed based on the D wave level (or S/N ratio).

Referring to FIG. 4, in step S1, the base station receives a wireless connection request from the terminal, through π/4 shift QPSK communication.

The base station constantly measures the received signal power, and based on the result of measurement, in step S2, measures the RSSI value, that is, the D wave level, from the carrier sense level.

Then, in step S3, the measurement is compared with a threshold value of the D wave level that allows communication by 16QAM, which is calculated beforehand and stored in a memory, not shown, of the base station.

As shown in Threshold Value Table A for channel allocation in FIG. 4, in order to attain BER necessary for 16QAM communication, the D wave level must be about 22 dBuV. Therefore, such a D wave level is stored as the threshold value, in the memory (Threshold Value Table A).

In step S3, the D wave level measured in step S2 is compared with the stored D wave level, and when the measured D wave level is not lower than the threshold value (22 dBuV), it means that the necessary BER is ensured even under 16QAM communication, and therefore, channel allocation is permitted and the control proceeds to the channel allocation procedure from step S5.

In step S3, if the measured D wave level is smaller than the threshold value (22 dBuV), the necessary BER for 16QAM communication cannot be attained. Therefore, the control proceeds to step S4, in which it is determined that channel allocation should be rejected. In step S14, the determination is notified to the terminal, and in step S15, the control enters a standby state.

If it is determined in step S3 that channel allocation is possible, the flow proceeds to step S5, in which an empty slot of the base station is searched for. If there is no empty slot found in step S6, it is determined in step S7 that the channel allocation should be rejected because of lack of empty slot, and the flow proceeds to steps S14 and S15 described above.

If an empty slot is found in step S6, the flow proceeds to step S8, in which an empty channel is searched for. Further, in step S9, if there is an empty channel, the U wave level of the channel is measured and compared with a channel allocation reference of PHS standard (STD-28), to determine whether the empty channel is in an allocatable state.

If there is no allocatable empty channel found in step S10, it is determined in step S11 that the channel allocation should be rejected because of lack of empty channel, and the flow proceeds to steps S14 and S15 described above.

If an allocatable empty channel is found in step S10, the flow proceeds to step S12, in which information of the slot/channel to be allocated is notified to the terminal.

Thereafter, the flow proceeds to step S13, in which a communication channel link is established using the slot and the wireless channel, and synchronization burst is transmitted between the terminal and the base station. Thereafter the modulation method is actually switched from the π/4 shift QPSK to 16QAM, and data communication is executed through the traffic channel TCH.

Here, it is noted that a terminal as a counterpart of communication of a base station supporting adaptive modulation does not always support adaptive modulation similarly. By way of example, even when the base station is capable of communication both by the π/4 shift QPSK and 16QAM methods, the terminal requesting connection may support only the π/4 shift QPSK method.

In such a case, the base station must determine whether channel allocation is possible or not to the terminal that communicates only by the π/4 shift QPSK method. Therefore, it is necessary for the base station supporting adaptive modulation to hold, in addition to the first threshold value of the D wave level for 16QAM communication, a second threshold value of the D wave level for π/4 shift QPSK communication, and to compare the measured D wave level with the second threshold value to determine channel allocation, when a connection request comes from a terminal that communicates only by the π/4 shift QPSK method.

By way of example, it is desirable that the D wave level of 18 dBuV required for the π/4 shift QPSK is stored as the threshold value in the base station, as shown in Threshold Value Table A for channel allocation of FIG. 4.

Therefore, in the first embodiment of the present invention, the base station may be adapted to hold, as D wave level threshold values, threshold values that allow communication by respective ones of the plurality of modulation methods having different multi-value numbers (π/4 shift QPSK and 16QAM) as the objects of adaptive modulation.

This makes it possible to determine whether channel allocation is possible or not for a terminal communicating by a modulation method having a small multi-value number (for example, the π/4 shift QPSK) using the threshold value corresponding to the modulation method, and to determine whether channel allocation is possible or not for a terminal capable of communicating by a plurality of modulation methods having different multi-value numbers (for example, the π/4 shift QPSK and 16QAM), using the threshold value corresponding to the modulation method (for example, 16QAM) having a larger multi-value number.

It is noted that when the reception noise level of the base station is known (for example, 2 dBuV), as shown in Threshold Value Table B in FIG. 4, not the D wave level but an equivalent S/N ratio may be used as the reference for determination. This is equivalent to the threshold value of Table C for channel allocation of S/N ratio, shown in Threshold Value Table C in FIG. 4. Further, in place of U wave measurement in step S9, the S/N ratio may be measured and used for determining whether allocation is possible or not using the empty channel.

In the second embodiment shown in FIG. 5, channel allocation is determined based on the D/U ratio.

Referring to FIG. 5, steps S21 to S35 are the same as steps S1 to S15 of FIG. 4, and therefore, description thereof will not be repeated. The method of determining allocation in accordance with the second embodiment shown in FIG. 5 differs from the method of determining allocation in accordance with the first embodiment shown in FIG. 4 in that in addition to the method of the first embodiment shown in FIG. 4, channel allocation is determined based on the D/U ratio in steps S36 and S37.

Specifically, after it is determined in step S30 that there is an empty channel, the D/U ratio is calculated from the D wave level measured in step S23 and the U wave level measured in step S29.

Thereafter, in step S36, the calculated ratio is compared with the threshold value of D/U ratio that allows communication by 16QAM, which is calculated beforehand and stored in a memory, not shown, of the base station.

As shown in Threshold Value Table D for channel allocation in FIG. 5, in order to ensure necessary BER for 16QAM communication, D/U ratio of about 20 dB is required. Therefore, such a D/U ratio is stored as the threshold value in the memory (Threshold Value Table D).

In step S36, the calculated D/U ratio is compared with the stored threshold value of D/U ratio, and if the calculated threshold value is not lower than the threshold value (20 dB), it means that the necessary BER is ensured even under 16 QAM communication, and therefore, channel allocation is permitted and the control proceeds to step S32.

If the calculated D/U ratio is smaller than the threshold value (20 dB), the necessary BER for 16QAM communication cannot be attained. Therefore, the control proceeds to step S34, in which it is determined that channel allocation should be rejected. In step S14, the determination is notified to the terminal, and in step S35, the control enters a standby state.

It is noted that, even when the base station is capable of communication both by the π/4 shift QPSK and 16QAM methods, the terminal requesting connection may support only the π/4 shift QPSK method, as described above.

In such a case, the base station must determine whether channel allocation is possible or not to the terminal that communicates only by the π/4 shift QPSK method. Therefore, it is necessary for the base station supporting adaptive modulation to hold, in addition to the first threshold value of the D/U ratio for 16 QAM communication, a second threshold value of the D/U ratio for π/4 shift QPSK communication, and to compare the calculated D/U ratio with the second threshold value to determine channel allocation, when a connection request comes from a terminal that communicates only by the π/4 shift QPSK method.

By way of example, it is desirable that the D/U ratio of 16 dB required for the π/4 shift QPSK is stored as the threshold value in the base station, as shown in Table D of channel allocation threshold values of FIG. 5.

Therefore, in the second embodiment of the present invention, the base station may be adapted to hold, as D/U ratio threshold values, threshold values that allow communication by respective ones of the plurality of modulation methods having different multi-value numbers (π/4 shift QPSK and 16QAM) as the objects of adaptive modulation.

As described above, according to the second embodiment, threshold determination of D/U ratio is performed in addition to threshold determination of D wave level, and therefore, channel allocation determination with higher accuracy becomes possible.

Next, in the third embodiment shown in FIG. 6, channel allocation is determined based on the D/U ratio, as in the second embodiment.

Referring to FIG. 6, steps S41 to S51 are the same as steps S21 to S31 of FIG. 5, and therefore, description thereof will not be repeated. The method of determining allocation in accordance with the third embodiment shown in FIG. 6 differs from the method of determining allocation in accordance with the second embodiment shown in FIG. 5 in that in the method of the third embodiment shown in FIG. 6, in place of the D wave level measured when wireless connection is requested (step S42), the D wave level measured at the time of receiving synchronizing burst (step S53) is used to calculate the D/U ratio.

More specifically, in step S53, the D wave level of the synchronizing burst signal received in the allocated slot is measured, and in step S54, the D/U ratio is calculated and compared with the threshold value in Threshold Value Table D. Comparison between the D/U ratio and Threshold Value Table D has already been described in detail with reference to the second embodiment of FIG. 5, and therefore, description will not be repeated here.

Based on the result of determination of step S54, if it is determined in step S55 that allocation should be rejected, connection to the terminal is cut in step S56, and the control enters the standby state (step S58).

On the contrary, based on the result of determination of step S54, if it is determined that allocation should be permitted, a slot is searched for in step S59 and the modulation method is changed in step S60.

As described above, according to the third embodiment, threshold determination of D/U ratio based on the D wave level when the synchronizing burst is received is performed in addition to threshold determination of D wave level at the time of connection, and therefore, channel allocation determination with higher accuracy becomes possible.

In the embodiments described above, when channel allocation is rejected, only a notice thereof is sent to the terminal. The terminal and the base station may be controlled such that when channel allocation for 16QAM is rejected, communication is established by another modulation method having smaller multi-value number than 16QAM.

The terminal that has received the notification of channel allocation rejection from the base station notifies the user about the rejection by a display on a display unit (for example, display unit 17 shown in FIG. 3).

Figure 7:
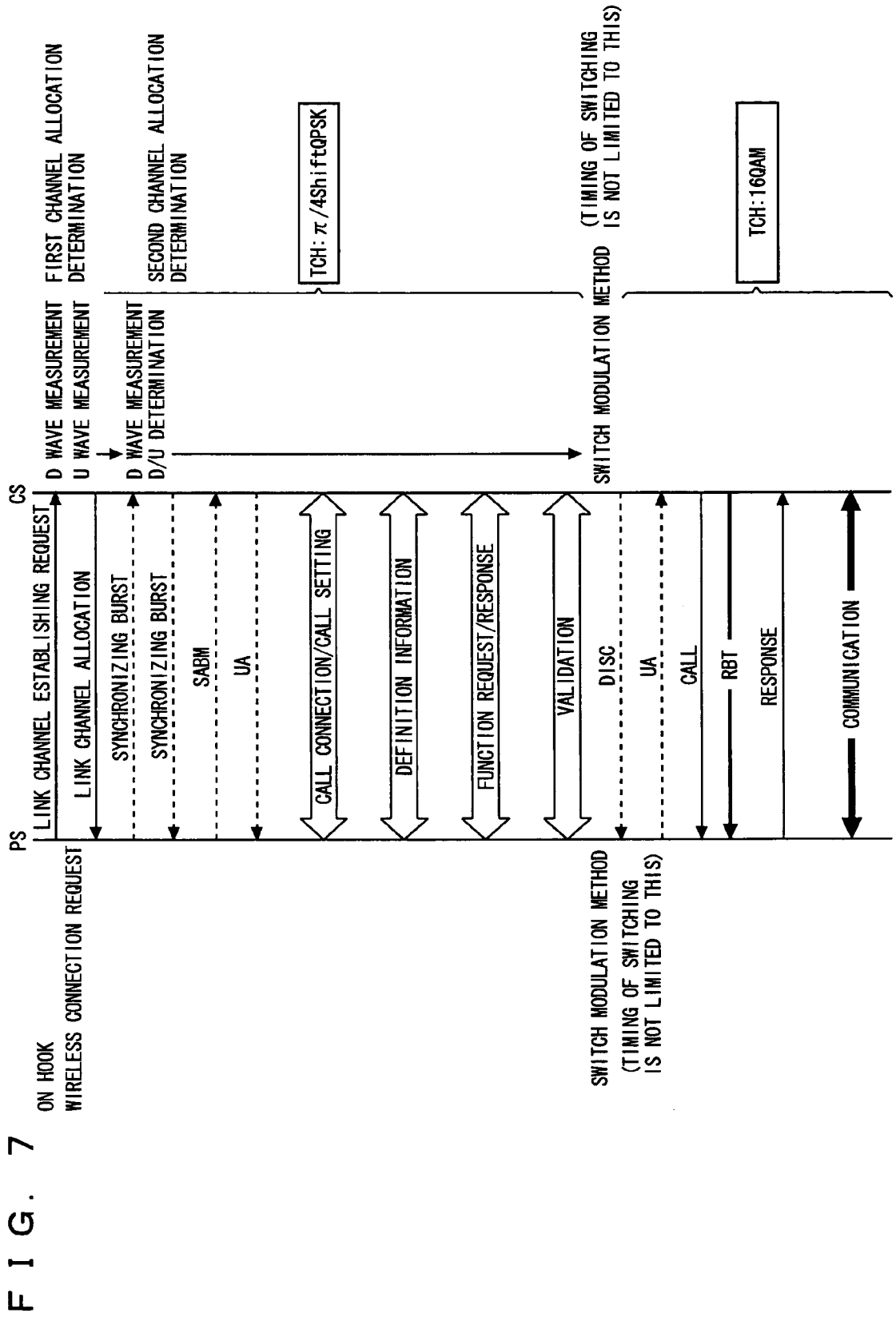
FIG. 7 is an illustration showing, with time, a communication procedure between a terminal and a base station in accordance with a third embodiment of the present invention.
Figure 8B:
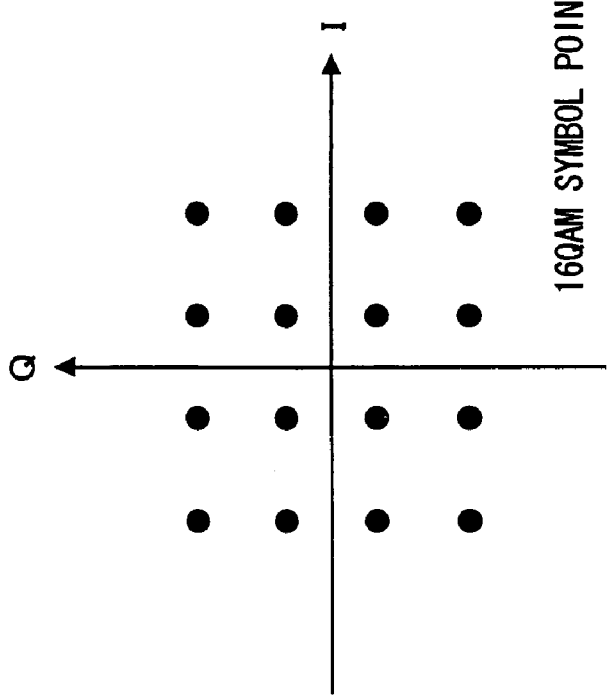
FIGS. 8A and 8B show arrangements of symbol points of $\pi/4$ shift QPSK and 16QAM, on an IQ coordinate plane.
Figure 8A:
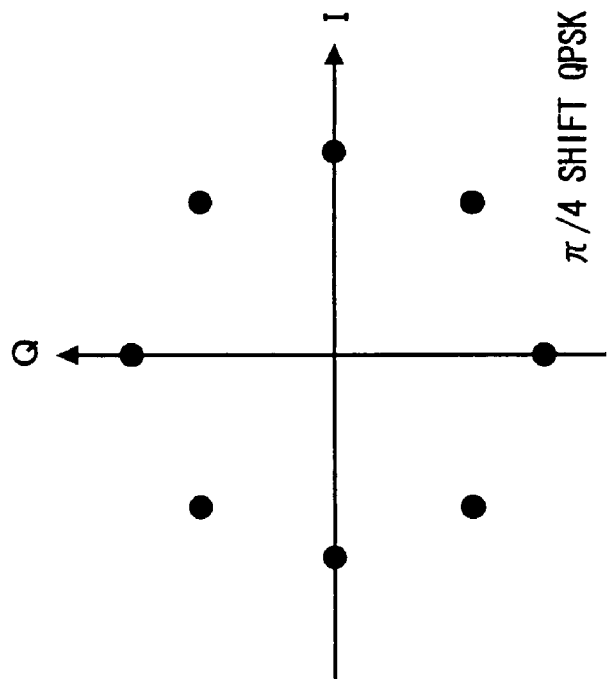
Figure 10:
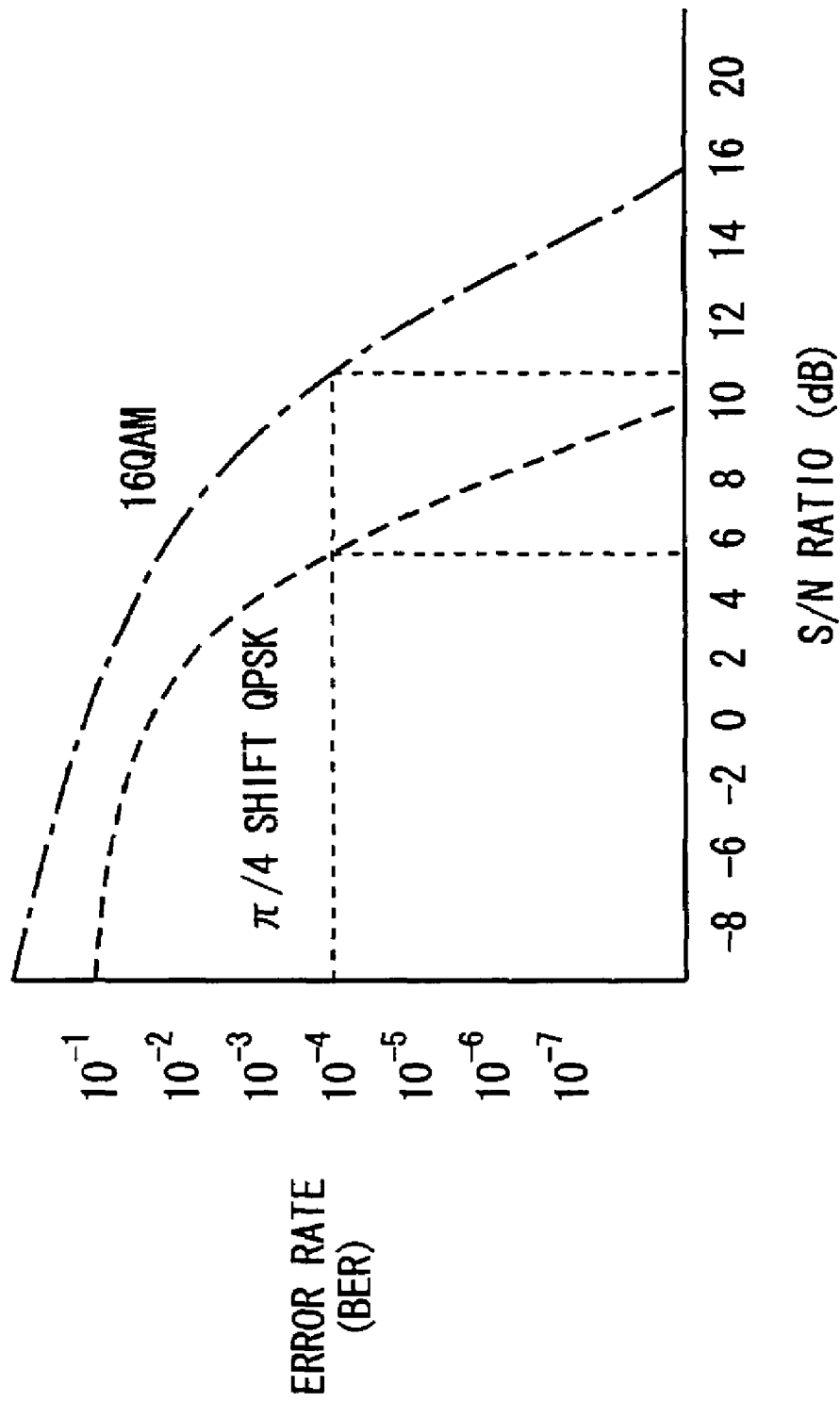
FIG. 10 shows relation between S/N ratio on the transmission path and BER for $\pi/4$ shift QPSK and 16QAM.

FIG. 7 is an illustration showing, with time, details of a communication procedure between a terminal PS and a base station CS in accordance with a third embodiment of the present invention. Specifically, it shows a call sequence activated on the terminal side.

Referring to FIG. 7, on the PS side, an on-hook wireless connection request is executed. Specifically, first in the control channel, a link channel establishing request is made from the PS to the CS.

In response, the D wave level is measured as described above, and whether the measured D wave level is not lower than the threshold value of D wave level for 16QAM or not is determined (first channel allocation determination). If it is determined that the level is not lower than the threshold value, it is determined that channel allocation should be permitted, the U wave is measured, and a link channel allocation is transmitted to the PS.

The exchange for the link channel allocation procedure takes place in the control channel CCH, by the π/4 shift QPSK having small multi-value number.

Thereafter, the operation proceeds to the traffic channel (TCH), while in this stage, the modulation method is still the π/4 shift QPSK method. In this stage, first, the D wave level is again measured when the synchronizing burst from the terminal is received. From the D wave level and the measured U wave level described above, the D/U ratio is calculated, and whether the calculated D/U ratio is not lower than the threshold value of D/U ratio corresponding to 16QAM or not is determined (second channel allocation determination). If it is determined to be not lower than the threshold value, it is determined that channel allocation should be permitted, the synchronizing burst is transmitted, well-known control signals such as SABM and UA are exchanged, and further, well-known procedures of call connection/call setting, definition information, function request/response, validation are performed.

After the end of these procedures, the modulation method is switched from the π/4 shift QPSK method to the 16QAM method having larger multi-value number. As described above, the D/U ratio satisfies the threshold value corresponding to 16QAM, and therefore, even when the modulation method is switched, communication quality does not degrade.

Communication through the traffic channel thereafter takes place under the 16QAM method. Specifically, well-known control signals such as DISC and UA are exchanged, well-known procedures such as a call, RBT and response are performed, and then, data communication starts.

As described above, according to the present invention, in a wireless apparatus supporting adaptive modulation, when there is a connection request from another wireless apparatus that similarly supports adaptive modulation, a parameter indicative of a communication environment of a transmission path is measured, and when the measured parameter value is not lower than a threshold value of the parameter at which communication is possible by a modulation method having larger multi-value number, wireless channel allocation for the said another wireless apparatus is permitted. Therefore, even when the modulation method is switched from one having smaller multi-value number to one having larger multi-value number during communication after connection (channel allocation) to another wireless apparatus, degradation of communication quality due to communication environment of the transmission path can be avoided.

INDUSTRIAL APPLICABILITY

As the present invention prevents degradation of communication quality at the time of switching modulation method, it is effective in a wireless apparatus supporting adaptive modulation.

The invention claimed is:

1. A wireless apparatus capable of supporting two types of modulation methods having different multi-value numbers, comprising:
   a modulation method switching unit configured to switch, when another wireless apparatus to be in wireless connection with the wireless apparatus is capable of supporting said two types of modulation methods, the modulation method between a first modulation method having a smaller multi-value number and a second modulation method having a larger multi-value number, while the wireless apparatus is communicating with said another wireless apparatus;
   a storing unit configured to store a first threshold value of a parameter indicative of communication environment of transmission path, at which the wireless apparatus can communicate with said another wireless apparatus at least by said second modulation method of said two types of modulation methods;
   a parameter measuring unit configured to measure said parameter based on a signal received from said another wireless apparatus;
   a parameter comparing unit configured to compare, when there is a connection request from said another wireless apparatus to the wireless apparatus, said stored first threshold value of the parameter corresponding to said second modulation method with said measured parameter; and
   a channel allocation determining unit configured to reject, when it is determined by said parameter comparing unit that said measured parameter is lower than said stored first threshold value of the parameter, allocation of a wireless channel to said another wireless apparatus, irrespective as to whether or not communication is actually done under the second modulation method,
   wherein said storing unit is further configured to store a second threshold value of a parameter indicative of communication environment of transmission path, at which the wireless apparatus can communicate with another wireless apparatus by said first modulation method, and
   when there is a connection request from another wireless apparatus that supports said first modulation method but not said second modulation method to the wireless apparatus, said parameter comparing unit compares said stored second threshold value of the parameter corresponding to said first modulation method with the parameter measured by said parameter measuring unit, and when it is determined by said parameter comparing unit that said measured parameter is lower than said stored second threshold value of the parameter, said channel allocation determining unit rejects allocation of a wireless channel to said another wireless apparatus that supports said first modulation method but not said second modulation method.

2. The wireless apparatus according to claim 1, wherein said channel allocation determining unit determines presence/absence of any empty slot and empty channel in the wireless apparatus, and when there is no empty slot or empty channel, rejects allocation of a wireless channel regardless of the result of comparison by said parameter comparing unit.

3. The wireless apparatus according to claim 1, further comprising
   a notifying unit configured to notify another wireless apparatus requesting connection to the wireless apparatus about rejection of channel allocation, when said channel allocation determining unit rejects allocation of the wireless channel.

4. The wireless apparatus according to claim 1, wherein the parameter is based on a reception signal level from another wireless apparatus requesting connection to the wireless apparatus.

5. A channel allocation method in a wireless apparatus capable of supporting two types of modulation methods of different multi-value numbers, said wireless apparatus including:
   a modulation method switching unit configured to switch, when another wireless apparatus to be in wireless connection with the wireless apparatus is capable of supporting said two types of modulation methods, the modulation method between a first modulation method having a smaller multi-value number and a second modulation method having a larger multi-value number, while the wireless apparatus is communicating with said another wireless apparatus; a storing unit configured to store a first threshold value of a parameter indicative of communication environment of transmission path, at which the wireless apparatus can communicate with said another wireless apparatus at least by the second modulation method of said two types of modulation methods; and a parameter measuring unit configured to measure said parameter based on a signal received from said another wireless apparatus;
   said channel allocation method comprising the steps of:
   comparing, when there is a connection request from said another wireless apparatus to the wireless apparatus, said stored first threshold value of the parameter corresponding to said second modulation method with the measured parameter; and
   rejecting, when it is determined that said measured parameter is lower than said stored first threshold of the parameter, allocation of a wireless channel to said another wireless apparatus, irrespective as to whether or not communication is actually done under the second modulation method,
   wherein said storing unit is further configured to store a second threshold value of a parameter indicative of communication environment of transmission path, at which the wireless apparatus can communicate with another wireless apparatus by the first modulation method; said method further comprising the steps of:
   comparing, when there is a connection request from another wireless apparatus that supports said first modulation method but not said second modulation method to the wireless apparatus, said stored second threshold value of the parameter corresponding to said first modulation method with said parameter measured by the parameter measuring unit; and rejecting, when it is determined that said measured parameter is lower than said stored second threshold value of the parameter, allocation of a wireless channel to said another wireless apparatus that supports said first modulation method but not said second modulation method.

6. The channel allocation method according to claim 5, further comprising the step of determining presence/absence of any empty slot and empty channel in the wireless apparatus, and when there is no empty slot or empty channel, rejecting allocation of a wireless channel regardless of the result of comparison in said parameter comparing step.

7. The channel allocation method according to claim 5, further comprising the step of notifying another wireless apparatus requesting connection to the wireless apparatus about rejection of channel allocation, when allocation of a wireless channel is rejected.

8. The channel allocation method according to claim 5, wherein said parameter is based on a reception signal level from another wireless apparatus requesting connection to the wireless apparatus.

9. A digital signal processor configured to execute a channel allocation program in a wireless apparatus capable of supporting two types of modulation methods of different multi-value numbers, said wireless apparatus including: a modulation method switching unit configured to switch, when another wireless apparatus to be in wireless connection with the wireless apparatus is capable of supporting said two types of modulation methods, the modulation method between a first modulation method having a smaller multi-value number and a second modulation method having a larger multi-value number, while the wireless apparatus is communicating with said another wireless apparatus; a storing unit configured to store a first threshold value of a parameter indicative of communication environment of transmission path, at which the wireless apparatus can communicate with said another wireless apparatus at least by the second modulation method of said two types of modulation methods; and a parameter measuring unit configured to measure said parameter based on a signal received from said another wireless apparatus;

said channel allocation program causing said digital signal processor to execute the steps of:

comparing, when there is a connection request from said another wireless apparatus to the wireless apparatus, said stored first threshold value of the parameter corresponding to said second modulation method with the measured parameter; and rejecting, when it is determined that said measured parameter is lower than said stored first threshold of the parameter, allocation of a wireless channel to said another wireless apparatus, irrespective as to whether or not communication is actually done under the second modulation method, wherein said storing unit is further configured to store a second threshold value of a parameter indicative of communication environment of transmission path, at which the wireless apparatus can communicate with another wireless apparatus by the first modulation method;

said channel allocation program causes the computer to further execute the steps of:

comparing, when there is a connection request from another wireless apparatus that supports said first modulation method but not said second modulation method to the wireless apparatus, said stored second threshold value of the parameter corresponding to said first modulation method with said parameter measured by the parameter measuring unit; and rejecting, when it is determined that said measured parameter is lower than said stored second threshold value of the parameter, allocation of a wireless channel to said another wireless apparatus that supports said first modulation method but not said second modulation method.

10. The digital signal processor according to claim 9, causing the computer to further execute the step of determining presence/absence of any empty slot and empty channel in the wireless apparatus, and when there is no empty slot or empty channel, rejecting allocation of a wireless channel regardless of the result of comparison in said parameter comparing step.

11. The digital signal processor according to claim 9, causing the computer to further execute the step of notifying another wireless apparatus requesting connection to the wireless apparatus about rejection of channel allocation, when allocation of a wireless channel is rejected.

12. The digital signal processor according to claim 9, wherein said parameter is based on a reception signal level from another wireless apparatus requesting connection to the wireless apparatus.

13. The wireless apparatus according to claim 1, wherein the wireless apparatus initially establishes the wireless connection with the another wireless apparatus using the first modulation method, wherein said parameter measuring unit periodically measures said parameter indicative of the communication environment of the transmission path, and wherein, when the parameter indicative of the communication environment of the transmission path is greater than the first threshold value, the wireless connection between the wireless apparatus and the another wireless apparatus is switched from the first modulation method to the second modulation method.

14. The wireless apparatus according to claim 1, wherein said parameter measuring unit measures said parameter indicative of the communication environment of the transmission path based only on a synchronization burst signal received by said wireless apparatus that is output by said another wireless apparatus.

15. The channel allocation method according to claim 5, further comprising:

initially establishing the wireless connection with the another wireless apparatus using the first modulation method, periodically measuring, by said parameter measuring unit, said parameter indicative of the communication environment of the transmission path, and switching, when the parameter indicative of the communication environment of the transmission path is greater than the first threshold value, the wireless connection between the wireless apparatus and the another wireless apparatus from the first modulation method to the second modulation method.

16. The channel allocation method according to claim 5, wherein said parameter measuring unit measures said parameter indicative of the communication environment of the transmission path based only on a synchronization burst signal received by said wireless apparatus that is output by said another wireless apparatus.

17. The digital signal processor according to claim 9, further causing a computer to execute the steps of:
- initially establishing the wireless connection with the another wireless apparatus using the first modulation method,
- periodically measuring, by said parameter measuring unit, said parameter indicative of the communication environment of the transmission path, and
- switching, when the parameter indicative of the communication environment of the transmission path is greater than the first threshold value, the wireless connection between the wireless apparatus and the another wireless apparatus from the first modulation method to the second modulation method.

* * * * *